United States Patent
Tripathi et al.

(10) Patent No.: US 9,460,409 B2
(45) Date of Patent: Oct. 4, 2016

(54) PROCESS MODELING RULE VALIDATION SYSTEM AND METHOD

(75) Inventors: Debadatta Tripathi, Bangalore (IN); Vikrant Shyamkant Kaulgud, Maharastra (IN)

(73) Assignee: Accenture Global Services Limited, Dublin (IE)

( * ) Notice: Subject to any disclaimer, the term of this patent is extended or adjusted under 35 U.S.C. 154(b) by 1026 days.

(21) Appl. No.: 13/102,525

(22) Filed: May 6, 2011

(65) Prior Publication Data

US 2011/0276913 A1    Nov. 10, 2011

(30) Foreign Application Priority Data

May 10, 2010   (IN) .......................... 1307/CHE/2010

(51) Int. Cl.
 G06F 3/048    (2013.01)
 G06Q 10/08    (2012.01)

(52) U.S. Cl.
 CPC .................... G06Q 10/08 (2013.01)

(58) Field of Classification Search
 CPC ...... G06Q 10/06; G06Q 10/08; G06Q 10/10; G06Q 10/063; G06Q 10/067; G06Q 10/0633; G06Q 10/0635; G06Q 10/00; G06F 17/5081; G06F 8/34; G06F 8/35; G06F 9/46; G06F 17/2725; G06F 9/44; G06F 15/177; G06N 5/00
 USPC ............ 706/47, 45, 59; 705/7.11, 7.27, 348; 712/244
 See application file for complete search history.

(56) References Cited

U.S. PATENT DOCUMENTS

| | | | |
|---|---|---|---|
| 2004/0102995 A1* | 5/2004 | Boppana | 705/1 |
| 2006/0129443 A1* | 6/2006 | Chen et al. | 705/8 |
| 2007/0094202 A1* | 4/2007 | Huang et al. | 706/47 |
| 2007/0288412 A1* | 12/2007 | Linehan | G06Q 10/06 706/45 |
| 2008/0172480 A1* | 7/2008 | Agrawal | H04L 67/1097 709/221 |
| 2010/0017009 A1* | 1/2010 | Baseman et al. | 700/109 |
| 2011/0029947 A1* | 2/2011 | Markovic | 717/102 |
| 2011/0066456 A1* | 3/2011 | Lu et al. | 705/7 |
| 2011/0078426 A1* | 3/2011 | Stoitsev | G06F 8/10 712/244 |
| 2011/0185284 A1* | 7/2011 | Allen | G06F 17/274 715/751 |

* cited by examiner

*Primary Examiner* — Amy Ng
*Assistant Examiner* — Sang H Kim
(74) *Attorney, Agent, or Firm* — Harrity & Harrity, LLP

(57) ABSTRACT

A process modeling rule validation system includes a graphical user interface module and a rule creation module. The graphical user interface module includes a display and at least one user input mechanism. The graphical user interface module displays information representative of a plurality of rule creation elements via the display and receives user input via the user input mechanism in response thereto. At least one of the rule creation elements can be configured based on the user input and in accordance with best practices in process modeling. The rule creation module, which is operatively connected to the graphical user interface module, generates a process modeling rule in response to at least one of the rule creation elements being configured.

20 Claims, 5 Drawing Sheets

PROCESS MODELING RULE VALIDATION SYSTEM AND METHOD

FIELD

The present disclosure generally relates to process modeling and, more particularly, to validation of process models.

BACKGROUND

Process modeling in systems engineering involves representing processes of various systems, such enterprise systems and/or other suitable systems, so that current processes can be analyzed and improved in the future. One example of process modeling is referred to as business process modeling. Business process modeling is typically performed to improve process efficiency and/or quality of operations.

Business process modeling can help identify the relationships of business processes in the context of the rest of the enterprise systems (e.g., data architecture, organizational structure, strategies, etc.) to create greater capabilities when analyzing and planning enterprise changes. For example, during a corporate merger it may be important to understand the processes of both companies so that management can correctly and efficiently identify and eliminate redundancies in operations.

Business process modeling typically includes a graphical representation of business information. More specifically, various process modeling elements are graphically interconnected in order to model a process such as a business process. There are many known modeling languages used to graphically represent business processes including, among others, Business Process Modeling Notation (BPMN) and the Unified Modeling Language (UML) for example. Each of these known modeling languages allow a user to create new process models. However, a user must be rather skilled in creating the process models to ensure that the process models perform correctly. If there is a problem with a new process model, the user can spend substantial time debugging the rule to operate correctly. In addition, a user must be rather skilled in process modeling to create new process models that are in accordance with best practices in process modeling.

Thus, it would be advantageous to develop a system and method that allows a process model user to create new process models without having specialized skills in creating process models and to avoid or minimize the substantial effort involved in coding, testing and debugging such process models.

SUMMARY

In one example, a process modeling rule validation system includes a graphical user interface module and a rule creation module. The graphical user interface module includes a display and at least one user input mechanism such as a cursor for example. The graphical user interface module displays information representative of a plurality of rule creation elements via the display and receives user input via the user input device in response thereto. At least one of the rule creation elements can be configured based on the user input and in accordance with best practices in process modeling. The rule creation module, which is operatively connected to the graphical user interface module, generates a process modeling rule in response to at least one of the plurality of rule creation elements being configured. A related method is also disclosed.

Among other advantages, the system and method provide process model users the ability to create new process models without having specialized skills in creating process models and avoids or minimizes the substantial effort involved in coding, testing and managing such process models. Other advantages will be recognized by those of ordinary skill in the art.

In one example, the process modeling rule validation system includes a rule repository module operatively connected to the rule creation module. The rule repository module stores the process modeling rule.

In one example, the process modeling rule validation system includes a process model analysis module operatively connected to the rule repository module. The process model analysis module is configurable via the graphical user interface module to determine whether a process model violates the process modeling rule. In one example, the process model analysis module is configurable via the graphical user interface module to determine whether the process model violates a previously defined process rule stored in the rule repository module. The graphical user interface module can display a rule violation graphic in response to the determination that the process model violates the process modeling rule. In one example, the process model analysis module generates a process model rule violation report in response to the process model violating the process modeling rule.

In yet another example, the process modeling rule is an executable rule that is executable by a plurality of process modeling systems. The user input can include information to provide suggested user changes when the process modeling rule is violated.

BRIEF DESCRIPTION OF THE DRAWINGS

The features of the present invention are set forth with particularity in the appended claims. The invention itself, together with further features and attended advantages, will become apparent from consideration of the following detailed description, taken in conjunction with the accompanying drawings. One or more embodiments of the present invention are now described, by way of example only, with reference to the accompanied drawings wherein like reference numerals represent like elements and in which:

DETAILED DESCRIPTION

Figure 1:
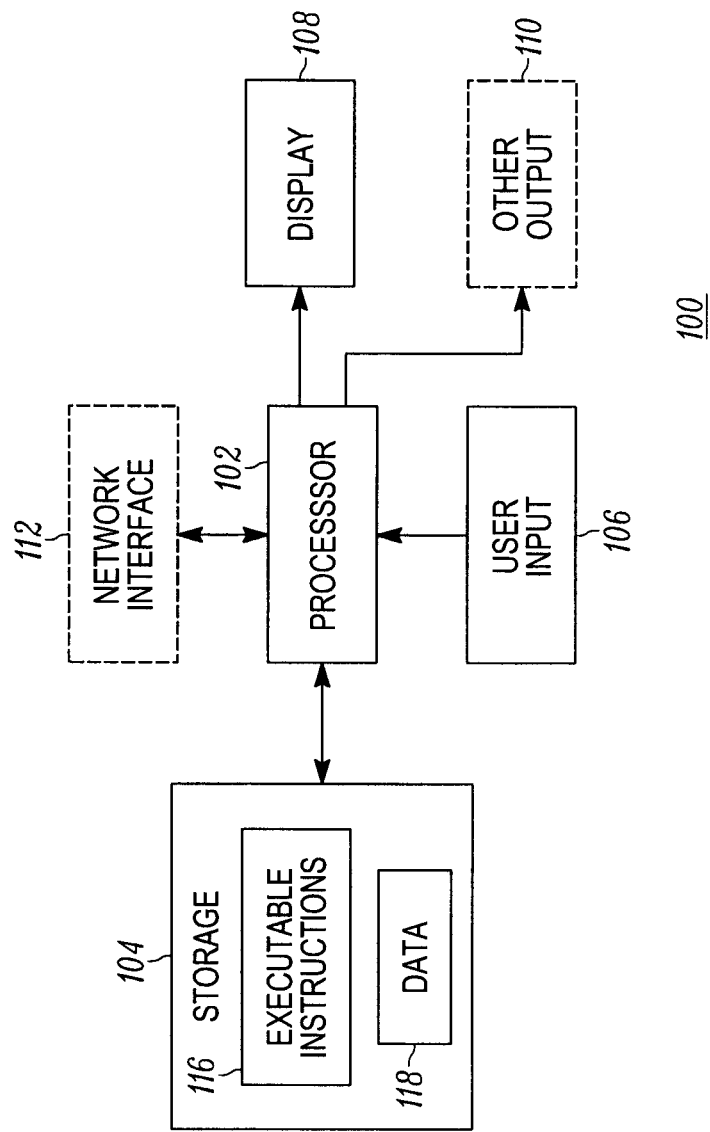
FIG. 1 is an exemplary block diagram of an apparatus that may be used in accordance with the present disclosure.

The following description is merely exemplary in nature and is in no way intended to limit the disclosure, its application, or uses. For purposes of clarity, the same reference numbers will be used in the drawings to identify similar elements. As used herein, the term "module" can include an electronic circuit, one or more processors (e.g., shared, dedicated, or group of processors such as but not limited to microprocessors, digital signal processors, and/or central processing units) and memory that execute one or more software or firmware programs, combinational logic circuits, an application specific integrated circuit, and/or other suitable components that provide the described functionality.

Referring now to FIG. 1, an apparatus suitable for implementing the present disclosure is depicted. The apparatus 100, which can comprise a general purpose computer or similar processing platform, includes a processor 102 in communication with a storage device 104, a user input 106, a display 108, other output mechanisms 110 and a network interface 112. The processor 102, which may comprise a microprocessor, microcontroller, digital signal processor, similar devices or combinations thereof, can operate under the control of executable instructions 116 stored in the storage device 104. Similarly, during operation, the processor 102 operates upon stored data 118, also included in the storage device 104, as well as other input data that may be provided via the user input 106 or the network interface 114. Further still, based on the operations undertaken by the processor 102, data may be output via the display 108 or the other output mechanism 112, as commonly known in the art. The storage device 104 can comprise one or more memory devices including, but not limited to, random access memory (RAM), read only memory (ROM), removable magnetic or optical storage media, hard drives, etc.

The user input 106 allows a user to interact with the apparatus 100 and control processing implemented by the processor 102 via one or more user inputs. The user input 106 can comprise a user selection device such as a mouse, touch screen, touch pad or similar such devices as known to those having ordinary skill in the art. The display 108 can comprise any display device typically used with a computer, either integral or external, such as a flat-panel display, cathode ray tube or suitable monitor. The other output mechanisms 112 can include lights, enunciators, speakers, or other components commonly found in computers that provide information to users thereof. The network interface 114, as known in the art, allows the device 100 to be coupled to public or private communication network, such as the Internet or proprietary networks such as enterprise local area or wide area networks, respectfully.

Figure 2:
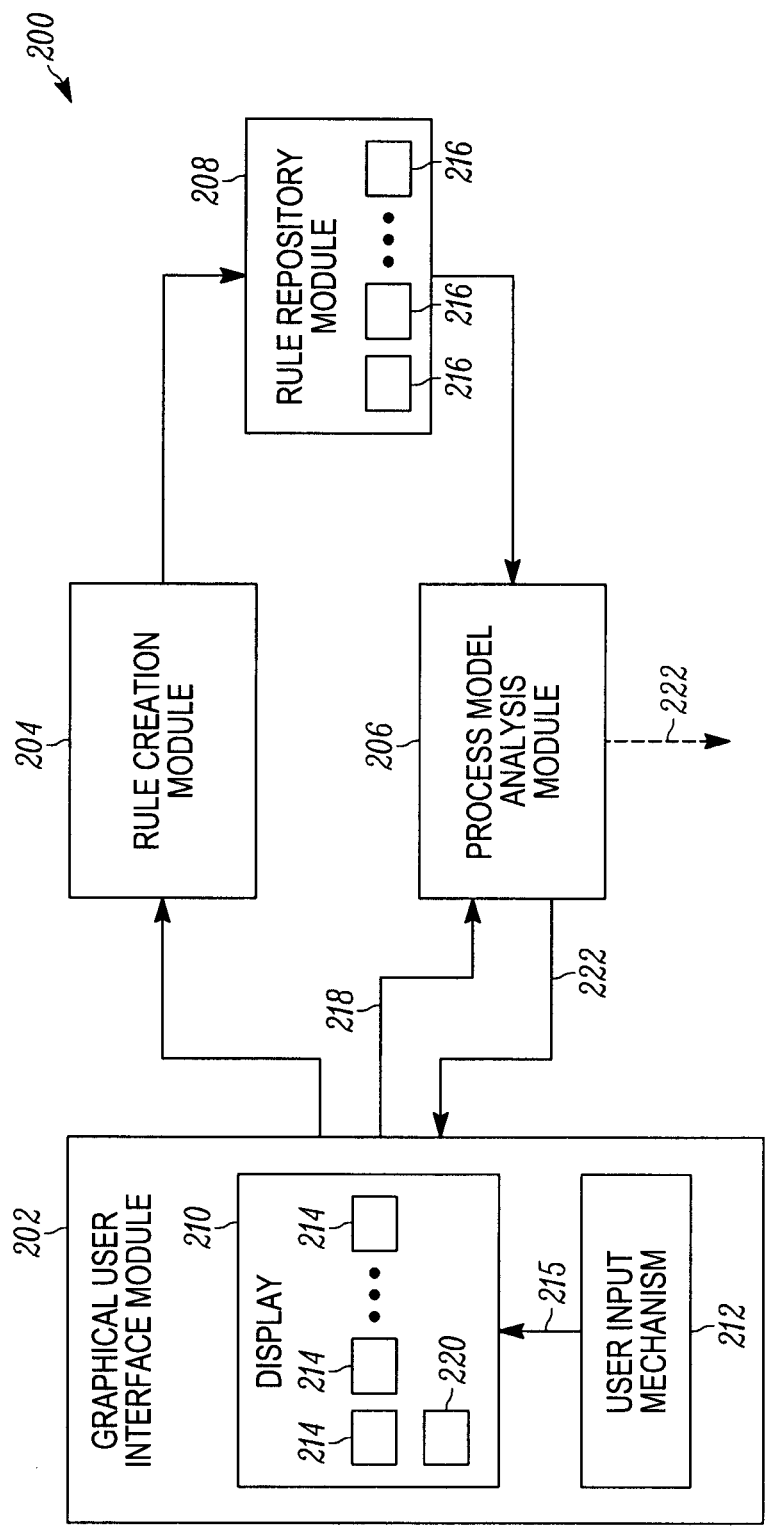
FIG. 2 is an exemplary block diagram of a process modeling rule validation system of the present disclosure.

Referring now to FIG. 2, a process modeling rule validation system 200 is depicted. The process modeling rule validation system 200 includes a graphical user interface module 202, a rule creation module 204, a process model analysis module 206, and a rule repository module 208. The user interface module 202 includes a display 210 and a user input mechanism 212 such as a cursor or other suitable user input mechanism as described, for example, in connection with FIG. 1. The graphical user interface 202 is operatively connected to the rule creation module 204 and the process model analysis module 206. Similarly, the rule repository module 208 is operatively connected to the rule creation module 204 and the process module analysis module 206.

The graphical user interface 202 displays, via the display 210, information representative of a plurality of rule creation elements 214 and receives user input 215 via the user input mechanism 212 in response to displaying the rule creation elements 214. The rule creation elements 214 are configured based on the user input 215 and/or in accordance with best practices in process modeling. Exemplary best practices (expressed in textual form) can include, among other things, "every receive should have an associated reply," "every invoke should have an associated fault handler," "every assign should have less than ten copies," "every scope should have less than 20 variables," "invoke counts should be less than ten," "length of a name variable should be less than 50," and/or other suitable practices.

The rule creation module 204 generates a process modeling rule 216 in response to one or more of the rule creation elements 214 being configured based on the user input 215 and/or in accordance with best practices in process modeling. For example, in one embodiment, syntax and semantics of a rule can be interpreted by a compiler program (e.g., Java or other suitable compiler) to convert the rule into an expression such as an XPath expression for example. In one embodiment, the process modeling rule 216 is executable and can be executed by multiple known process modeling systems such as systems having XPath engines and/or other suitable known process modeling systems.

The rule repository module 208, which can comprise any suitable database or other suitable storage means, stores the process modeling rule 216. In one embodiment, rule repository 208 comprises an extensible markup language (XML) configuration file stored in an appropriate storage device or an appropriately programmed Structure Query Language (SQL) server.

When desired, a user can interact with the graphical user interface 202 to create a process model 218 such as a business process model and/or other process model. The process model analysis module 206 determines whether the process model 218 violates one or more of the modeling rules 216. More specifically, the process model analysis module 206 determines whether the process model 218 violates one or more previously defined process model rules 216 stored in the rule repository module 208.

The process model analysis module 206 determines whether the process model 218 violates one or more of the process model rules 216 using any suitable known methodology known in the art. For example, the process model analysis module 206 can employ forward chaining, in which the process model analysis module 206 compares the antecedents of one or more process model rules 216 against the process model 218 and, if a match is found, adds the consequent of each rule to the asserted facts, i.e., the rule is satisfied if its conditions are met. Alternatively, the process model analysis module 206 can employ backward chaining in which it first attempts to match the consequent of one or more of the process model rules 216 and, when such a match is found, further attempts to find a match to the antecedent of the matched rule, i.e., if the goal of the rule is found, the rule is satisfied if its conditional statement is also found.

The process model analysis module 206 is configurable via the graphical user interface 202. For example, the user can select which of the process model rules 216 are to be used by the process model analysis module 206 when determining whether one or more of the process model rules 216 have been violated.

In one embodiment, when the process model analysis module 206 determines that the process model 218 violates the modeling rule 216, a rule violation graphic 220 can be displayed on the graphical user interface 202. The rule violation graphic 220 can notify the user of the violation and, if the rule is constructed to do so, can provide suggestions to the user to correct the process model 218 so that the process modeling rule 216 is no longer violated. In addition to, or instead of, displaying the rule violation graphic 220 on the graphical user interface 202, the process analysis module 206 can generate a rule violation report 222. The rule violation report 222 can be displayed in text, graphical, and/or other suitable format on the graphical user interface 202. Additionally, or alternatively, the rule violation report 222 (as illustrated by the dashed line) can be provided to the other output mechanism 110 such as a printer for example.

Figure 3:
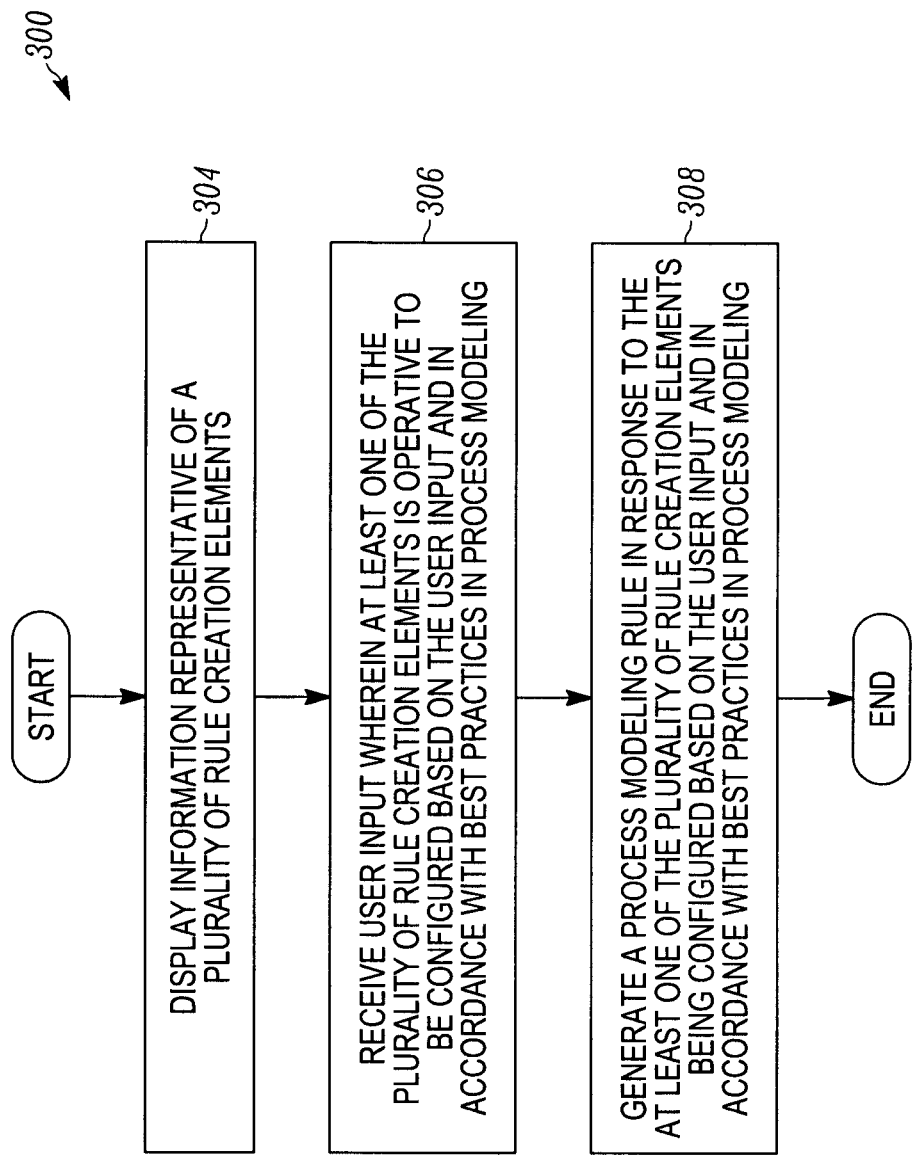
FIG. 3 is a flowchart depicting exemplary operations that can be performed by the process modeling rule validation system.

Referring now to FIG. 3, exemplary operations that can be performed by the process model rule validation system 200 to create a process modeling rule are generally identified at 300. At block 304, the graphical user interface module 202 displays information representative of the rule creation elements 214. At block 306, the user input mechanism 212 receives user input 215 in response to displaying the information representative of the rule creation elements 214. As previously noted, one or more of the rule creation elements 214 can be configured based on the user input 215 and in accordance with best practices in process modeling. At block 308, the rule creation module 204 generates the process modeling rule 216 in response to one or more of the rule creation elements 214 being configured based on the user input 215 and in accordance with best practices in process modeling.

Figure 4:
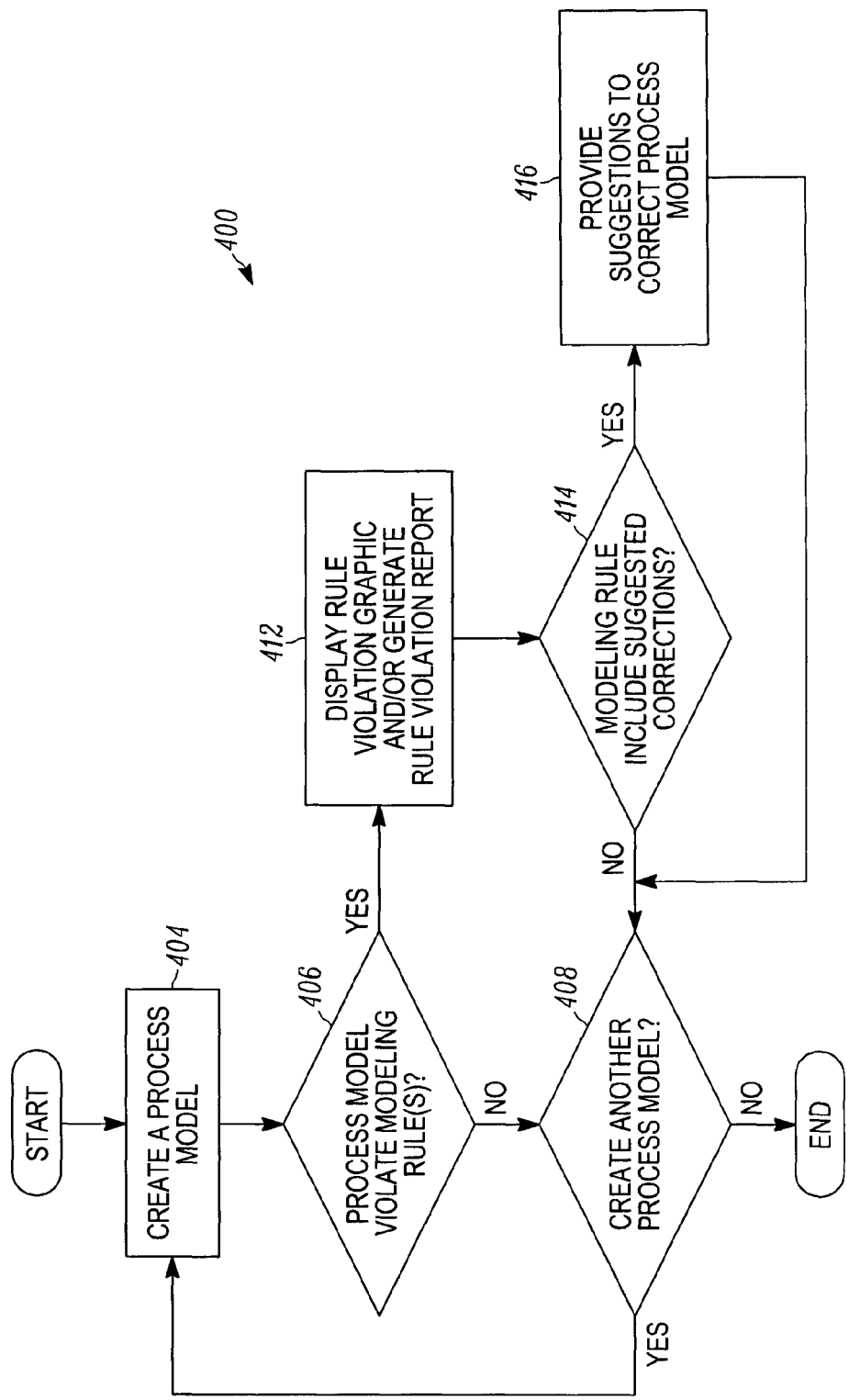
FIG. 4 is a flowchart additional exemplary operations that can be performed by the process modeling rule validation system.

Referring now to FIG. 4, exemplary operations that can be performed by the process modeling rule validation system 200 to validate a process model are generally identified at 400. At block 404, a user creates the process model 218 using the graphical user interface 202. At block 406, the process analysis module 206 determines whether the process model 218 violates one or more process modeling rules 216. The process model analysis module 206 can determine whether the process model 218 violates the process modeling rule 216 based on, for example, a required functional behavior (e.g., functional tests), invalid syntax for one or more process modeling systems (e.g., design guidelines), invalid combination of process modeling design elements (e.g., adherence to process modeling architecture), best practices in process modeling, and/or other suitable requirements.

If the process model 218 does not violate one or more of the process modeling rules 216, the process proceeds to block 408. At block 408, the process modeling rule validation system 200 determines whether the user desires to create another process model. If the user does desire to create another process model, the process returns to block 404.

If the process analysis module 206 determines that the process model 218 violates one or more of the process modeling rules 216 at block 406, the process analysis module 206 instructs the graphical user interface 202 to display the rule violation graphic 220 and/or generates the rule violation report 222 at block 412. As noted above, some process modeling rules 216 may include suggestions to aid the user in correcting process models that violate one or more process rules 216. As such, at block 414 the process analysis module 206 determines whether the one or more process modeling rules 216 that were violated include suggested corrections to aid the user in correcting the process model 218. If the violated process modeling rule(s) 216 do not include such information, the process proceeds to block 408 as described above. However, if the violated process modeling rule(s) 216 do include such information, the process analysis module 206 provides suggestions to correct the process model 218 at block 416. The suggestions can be provided to the user in any suitable manner such as displayed on the display 210, provided in the rule violation report 222, and/or other suitable means. Once the process analysis module 206 provides the suggestions to correct the process model 218, the process proceeds to block 408.

Figure 5:
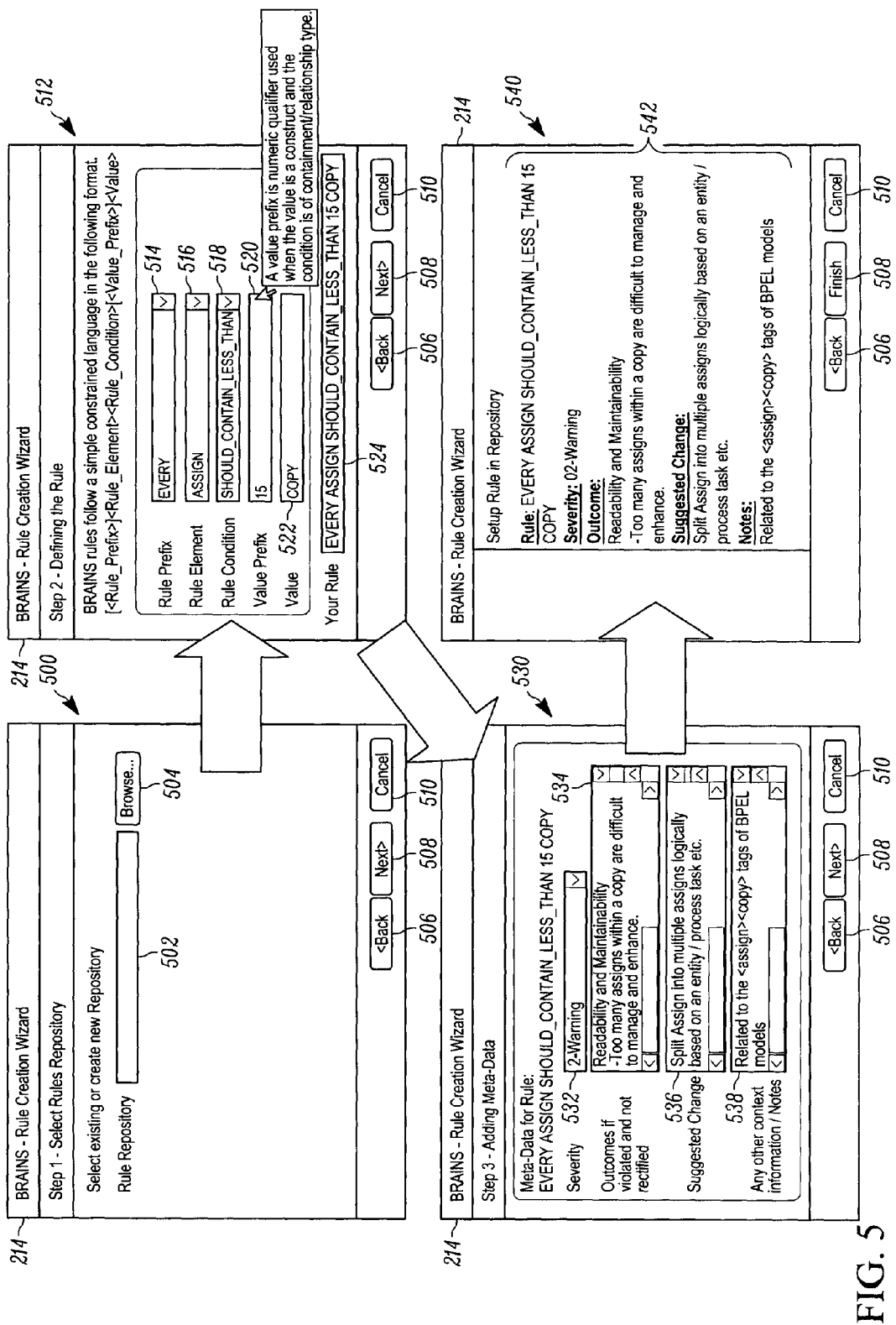
FIG. 5 is an exemplary depiction of rule creation element(s) that can be used in accordance with the process modeling rule validation system.

Referring now to FIG. 5, exemplary depictions of the rule creation elements 214 are depicted. In this example, when the user desires to create a new process modeling rule, the rule creation element 214 can initially be displayed as generally identified at 500. As shown at 500, the rule creation element 214 includes a text field 502 where the user can enter a textual name of a new or previously created process modeling rule 216 in order to create or edit the rule. Alternatively, if the user doesn't know the textual name and/or location of the previously created process modeling rule 216, the user can activate a browse element 504 to search for the previously created process modeling rule 216. As shown at 500, the rule creation element 214 can also include a back element 506, a next element 508, and a cancel element 510 if desired. For example, the back element 506 can return the user to previous configuration of the rule creation element 214, the next element 508 can be used to progress to the next configuration of the rule creation element 214, and the cancel element 510 can be used to abort the process model rule creation process. Additionally, if desired, the rule creation element 214 at 500 can be configured so that if the text field 502 is blank (e.g., empty), the rule creation module 204 creates a new process modeling rule 216 that has an automatically assigned textual name and/or location.

When the user activates the next element 508, the rule creation element 214 proceeds to the configuration generally identified at 512. As shown at 512, the rule creation element 214 includes various drop down elements and text fields although other known elements can be used if desired. In this example, the user can define the process model rule 216 using information such as a rule prefix 514, a rule element 516, a rule condition 518, a value prefix 520, and a value 522. Although not shown in this example, skilled artisans will appreciate that other suitable information can be included in defining the process modeling rule 216 if desired. In addition, as shown at 512, the rule creation element 214 can also include a rule summary 524 if desired.

The rule prefix 514 generally describes the attribute of the rule element that is being evaluated such as its name, count, etc. A non-exhaustive list of exemplary rule prefixes and definitions are listed below in Table 1.

TABLE 1

| | |
|---|---|
| COUNT_OF | Define the count of a particular constructs |
| EVERY | Indicates that the rule be run for every instance of the element |
| NAME_OF | Defines the name of a particular construct/element |
| LENGTH_OF_NAME_OF | Defines the length of the name of a particular construct/element |

The rule element 516 generally describes a quality and/or attribute of what is being evaluated. A non-exhaustive list of exemplary rule elements and definitions are listed below in Table 2.

TABLE 2

| | |
|---|---|
| CONSTRUCT | A generic wildcard for a BPEL construct |
| RECEIVE | The receive construct |
| REPLY | The reply construct |
| INVOKE | The Invoke construct |

TABLE 2-continued

| | |
|---|---|
| SCOPE | The scope construct |
| CATCH | The Catch construct |
| ASSIGN | The Assign construct |
| VARIABLE | The variable construct |
| PARTNERLINK | The partnerlink construct |
| TERMINATE | The terminating the process construct |
| WAIT | Suspend the execution of the current path |
| EMPTY | no corresponding construct |
| SEQUENCE | Series of activities that are available |
| SWITCH | The switch construct |
| WHILE | The while construct |
| PICK | Waits till one event in a set of events occurs |
| FLOW | initiates an asynchronous BPEL |
| SCOPE | The scope construct |
| COMPENSATION/COMPENSATE | The construct to 'reverse' and 'undo' previous activities. |
| CORRELATIONSETS | The construct for repeated (synchronous) access |
| FAULTHANDLER | fault propagation construct |
| COMPENSATIONHANDLER | Container for the activities that perform compensation actions. |
| EVENTHANDLER | Deal with events that happen independent of, and asynchronously to, the execution of the program. |
| COMPENSATESCOPE | Scope activity inside the Catch, CatchAll, Compensation/Termination Handler. |
| EMPTY | The empty construct |
| EXIT | The variable construct |
| EXTENSIONACTIVITY | An Extension Activity is basically a Java class with a given interface that is registered to the BPEL engine under a qualified name. |
| FLOW | The flow construct |
| FOREACH | The foreach construct |
| IF | The if construct |
| INVOKE | The invoke construct |
| RECEIVE | The receive construct |
| REPEATUNTIL | The repeat until a condition is satisfied |
| REPLY | The reply construct |
| RETHROW | The rethrow construct |
| SCOPE | The scope construct |
| SEQUENCE | The sequence construct |
| THROW | The throw exception construct |
| VALIDATE | The validate construct |
| WAIT | The wait construct |
| WHILE | The while construct |

The rule condition 518 generally describes a condition, such as the logic of the rule or the evaluation criteria, that the rule element 516 is subjected to during execution of the rule. A non-exhaustive list of exemplary rule conditions and definitions are listed below in Table 3.

TABLE 3

| | |
|---|---|
| SHOULD_BE_GREATER_THAN | Check if a value of an attribute of a construct is greater than a specified value |
| EQUALS | A specific attribute of a construct or a construct having a specific value |
| SHOULD_BE_LESS_THAN | Check if a value of an attribute of a construct is less than a specified value |
| SHOULD_CONTAIN | Check a +ve containment relationship, e.g. Invoke should contain a Catch |
| SHOULD_CONTAIN_MORE_THAN | Check a +ve containment relationship, e.g. Invoke should contain a Catch |
| SHOULD_CONTAIN_LESS_THAN | Check a +ve containment relationship, e.g. Invoke should contain a Catch |
| SHOULD_CONTAIN_ONLY_ONE | Check a unique single child relationship, e.g. Invoke should contain a Partnerlink |
| SHOULD_CONTAIN_MULTIPLE | Check a multiple child relationship, e.g. Assign should contain multiple copy |
| SHOULD_NOT_CONTAIN | Check a −ve containment relationship, e.g. Catch should not contain a Terminate |
| SHOULD_HAVE_AN_ASSOCIATED | Checks a +ve association relationship, e.g. Receive should have associated reply |
| SHOULD_START_WITH | Checks if a name or text based attribute starts with a specific string |
| SHOULD_END_WITH | Checks if a name or text based attribute starts with a specific string |
| SHOULD_CONTAIN_TEXT | Checks if a name or text based attribute contains a specific string |

The value prefix 520 is a numeric qualifier that generally describes the value 522 when the value 522 is a construct and the condition is a containment relationship. A non-exhaustive list of value prefixes are listed below in Table 4.

TABLE 4

A number
A generic String

For example, in the rule "variables SHOULD_CONTAIN_LESS_THAN 10 variable", the value 10 is the value prefix. As another example, in the rule "assign SHOULD_CONTAIN_LESS_THAN 15 copy", the value 15 is the value prefix.

The value 522 is the measure of the variable in which the rule condition 518 is applied. For example, the value 522 can be a string, numeric, and/or another construct. In one example, the value is the constant part of a boolean expression that evaluates to a true or false output. A non-exhaustive list of exemplary values are listed below in Table 5.

TABLE 5

A generic string
A number
Another suitable construct/element

Referring back to FIG. 5, when the user activates the next element 508 at 512, the rule creation element 214 proceeds to the configuration generally identified at 530. As shown at 530, the rule creation element 214 includes various drop down elements and text fields although other known elements can be used if desired. In this example, the user can add meta data to the process model rule 216 using information such as a severity indication 532, a violation outcome 534 (i.e., assuming that the violation remains uncorrected), a suggested change 536 that can be followed by the user to correct the violation, and other suitable context information or notes 538. Although not shown in this example, skilled artisans will appreciate that other suitable meta data can be included in defining the process modeling rule 216 if desired.

When the user activates the next element 508 at 530, the rule creation element 214 proceeds to the configuration generally identified at 540. As shown at 540, the rule creation element 214 displays process model rule configuration information 542 as defined at 500, 512, and 530. If the process model rule configuration information 542 is satisfactory, the user can activate a finish element 544. In response to the activation of the finish element 544 the rule creation module 204 generates the process modeling rule 216 based on the criteria provided at 500, 512, and 530. However, if the user is not satisfied with the process model rule information 542, the user can return to 500, 512, and/or 530 using the back and next elements 506, 508 or the user can abort creating the process modeling rule 216 by activating the cancel 510 element.

As noted above, the process modeling rule validation system and method as described herein provide process model users the ability to create new process models without having specialized skills in creating process models and avoids or minimizes the substantial effort involved in coding, testing and debugging such process models. This is achieved by utilizing the rule creation module to create process modeling rules that can be selectively used in conjunction with the process module analysis module when creating a process model. Other advantages will be recognized by those of ordinary skill in the art.

While the particular preferred embodiments of the present invention have been shown and described, it will be obvious to those skilled in the art that changes and modifications may be made without departing from the teachings of the invention. It is therefore contemplated that the present invention cover any and all modifications, variations or equivalents that fall within the scope of the basic underlying principles disclosed above and claimed herein.

What is claimed is:

1. A system comprising:
a processor to:
provide, for display, information representative of a plurality of rule creation elements,
receive user input after providing, for display, the information representative of the plurality of rule creation elements,
the user input including information regarding an outcome of violating a process modeling rule and one or more suggestions to correct a process model when the process model violates the process modeling rule,
configure at least one of the plurality of rule creation elements based on the user input and in accordance with best practices in process modeling,
generate the process modeling rule based on the at least one of the plurality of rule creation elements being configured based on the user input and in accordance with the best practices in process modeling,
determine that the process model violates the process modeling rule based on one of a required functional behavior, an invalid syntax for one or more process modeling systems, or an invalid combination of process modeling design elements,
the process model representing a process using Business Process Model and Notation (BPMN) or Unified Modeling Language (UML),
determine that the process modeling rule includes the one or more suggestions to correct the process model based on determining that the process model violates the process modeling rule, and
provide, for display, information based on the one or more suggestions to correct the process model.

2. The system of claim 1, further comprising:
a rule repository module to store the process modeling rule.

3. The system of claim 1, where the processor is further to:
determine that the process model violates a previously defined process rule stored in a rule repository module, and
provide, for display, information based on determining that the process model violates the previously defined process rule.

4. The system of claim 1, where the processor is further to:
provide, for display, a rule violation graphic based on determining that the process model violates the process modeling rule.

5. The system of claim 1, where the processor is further to:
generate a process model rule violation report based on determining that the process model violates the process modeling rule.

6. The system of claim 1, where the process modeling rule is an executable rule that is executable by a plurality of process modeling systems.

7. The system of claim 1, where the best practices in process modeling define one or more numerical limitations for generating the process modeling rule.

8. A method comprising:
providing, by a computer and for display, information representative of a plurality of rule creation elements;
receiving user input, by the computer and after providing, for display, the information representative of the plurality of rule creation elements,
the user input including information regarding an outcome of violating a process modeling rule and one or more suggestions to correct a process model when the process model violates the process modeling rule;
configuring, by the computer, at least one of the plurality of rule creation elements based on the user input and in accordance with best practices in process modeling;
generating, by the computer, the process modeling rule based on the at least one of the plurality of rule creation elements being configured based on the user input and in accordance with the best practices in process modeling;
determining, by the computer, that the process model violates the process modeling rule based on one of a required functional behavior, an invalid syntax for one or more process modeling systems, or an invalid combination of process modeling design elements,
the process model representing a process using Business Process Model and Notation (BPMN) or Unified Modeling Language (UML);
determining, by the computer, that the process modeling rule includes the one or more suggestions to correct the process model based on determining that the process model violates the process modeling rule; and
providing, by the computer and for display, information based on the one or more suggestions to correct the process model.

9. The method of claim 8, further comprising:
storing the process modeling rule in a rule repository module.

10. The method of claim 8, further comprising:
determining that the process model violates a previously defined process rule stored in a rule repository module.

11. The method of claim 8, further comprising:
providing, for display, a rule violation graphic based on determining that the process model violates the process modeling rule.

12. The method of claim 8, further comprising:
generating a process model rule violation report based on determining that the process model violates the process modeling rule.

13. The method of claim 8, where the process modeling rule is an executable rule that is executable by a plurality of process modeling systems.

14. The method of claim 8, where the best practices in process modeling define at least one of a threshold for invoke counts or a length of a variable.

15. A non-transitory computer-readable medium storing instructions, the instructions comprising:
one or more instructions that, when executed by at least one processor, cause the at least one processor to:
provide, for display, information representative of a plurality of rule creation elements;
receive user input after providing, for display, the information representative of the plurality of rule creation elements,
the user input including information regarding an outcome of violating a process modeling rule and one or more suggestions to correct a process model when the process model violates the process modeling rule;
configure at least one of the plurality of rule creation elements based on the user input and in accordance with best practices in process modeling;
generate the process modeling rule based on the at least one of the plurality of rule creation elements being configured based on the user input and in accordance with the best practices in process modeling;
determine that the process model violates the process modeling rule based on one of a required functional behavior, an invalid syntax for one or more process modeling systems, or an invalid combination of process modeling design elements,
the process model representing a process using Business Process Model and Notation (BPMN) or Unified Modeling Language (UML);
determine that the process modeling rule includes the one or more suggestions to correct the process model based on determining that the process model violates the process modeling rule; and
provide, for display, the one or more suggestions to correct the process model based on determining that the process modeling rule includes the one or more suggestions to correct the process model.

16. The non-transitory computer-readable medium of claim 15, where a particular best practice, of the best practices, indicates the at least one of the plurality of rule creation elements should have less than a particular quantity of variables.

17. The non-transitory computer-readable medium of claim 15, where the instructions further comprise:
one or more instructions that, when executed by the at least one processor, cause the at least one processor to:
create a new process model after providing the one or more suggestions to correct the process model.

18. The non-transitory computer-readable medium of claim 17, where the one or more instructions to create the new process model comprise:
one or more instructions that, when executed by the at least one processor, cause the at least one processor to:
determine that a user desires to create the new process model after providing the one or more suggestions to correct the process model, and
create the new process model after determining that the user desires to create the new process model.

19. The non-transitory computer-readable medium of claim 15, where the best practices in process modeling define one or more numerical limitations for generating the process modeling rule.

20. The non-transitory computer-readable medium of claim 15, where the instructions further comprise:
one or more instructions that, when executed by the at least one processor, cause the at least one processor to:
provide, for display and before providing the one or more suggestions, a rule violation graphic based on determining that the process model violates the process modeling rule.

* * * * *